United States Patent [19]

Torres

[11] Patent Number: 5,241,624

[45] Date of Patent: Aug. 31, 1993

[54] METHOD FOR DETERMINING A USER SELECTED GROUP OF DATA OBJECTS FOR THE PROPAGATION OF ATTRIBUTE VALUES

[75] Inventor: Robert J. Torres, Colleyville, Tex.

[73] Assignee: International Business Machines Corporation, Armonk, N.Y.

[21] Appl. No.: 771,280

[22] Filed: Oct. 3, 1991

[51] Int. Cl.⁵ .......................... G06F 7/00; G06F 7/06
[52] U.S. Cl. .................................. 395/129; 395/144; 395/146; 395/151; 395/155; 395/700; 364/927.2; 364/927.66; 364/DIG. 2
[58] Field of Search ................. 395/600, 76, 129-132, 395/150, 155, 151, 157, 148, 149, 146, 700; 340/723, 799; 364/419

[56] References Cited

U.S. PATENT DOCUMENTS

| | | | |
|---|---|---|---|
| 4,384,285 | 5/1983 | Long et al. | 340/723 |
| 4,658,370 | 4/1987 | Erman et al. | 395/76 |
| 4,755,814 | 7/1988 | Olsen | 340/799 |
| 4,855,949 | 8/1989 | Garland et al. | 395/129 |
| 4,862,376 | 8/1989 | Ferriter et al. | 364/468 |
| 4,866,634 | 9/1989 | Reboh et al. | 395/76 |
| 4,868,743 | 9/1989 | Nishio et al. | 395/600 |
| 4,881,197 | 11/1989 | Fischer | 395/600 |
| 4,962,475 | 10/1990 | Hernandez et al. | 395/146 |
| 5,010,478 | 4/1991 | Deran | 395/600 |
| 5,111,413 | 5/1992 | Lazansky et al. | 395/600 |
| 5,181,162 | 1/1993 | Smith et al. | 395/600 |

Primary Examiner—Thomas C. Lee
Assistant Examiner—Jennifer M. Orzech
Attorney, Agent, or Firm—Andrew J. Dillon; Paul W. O'Malley

[57] ABSTRACT

Identification of a target object within an object hierarchy is made in response to user selection. The prior attribute values for the target object are then displayed on a display device. Upon user selection, new object attribute values are generated for the target object. A propagation group for the new object attribute values is made in response to user designation of relating factors and the new object attribute values are applied to all objects within the related group.

8 Claims, 17 Drawing Sheets

METHOD FOR DETERMINING A USER SELECTED GROUP OF DATA OBJECTS FOR THE PROPAGATION OF ATTRIBUTE VALUES

BACKGROUND OF THE INVENTION

1. Field of the Invention

The invention relates in general to methods for propagating object attribute values among objects in a data processing system, and in particular to methods for enhancing access and options for changing object attribute values among groups of objects. Still more particularly, the invention relates to methods for defining propagation groups for object attribute values without limitation of object rank or predefined object relationships.

2. Description of the Prior Art

In data processing, the term "object" refers to a collection of data referred to by a single name. An object is identified both to the computer and to a user by its name. An object has "attributes" which relate to manipulation of the object by the computer. At the most basic level, a name is an attribute of all objects. A specific name for an object is an attribute value. An example of an object is a word processing document. Those skilled in the art will appreciate that a word processing document will have a name, a font, a line spacing definition, and a background color. These are attributes. Their specific manifestation are object attribute values.

Objects of an "object type" are related by attributes that define the purpose of the objects within a data processing system. Each object type has associated with it a set of commands with which to process that type. Membership in an "object class" is more arbitrary. A class is a category to which objects are assigned or defined.

The categorization of object as being of object types or object classes is not merely a semantic exercise, but underlies the basic organization of data within a computer Object types and classes exist in a particular object hierarchy within the data processing system. System level and program level objects are at the top of the hierarchy. User oriented objects such as word processing documents exist at intermediate or lower levels of the hierarchy. Thus an object may depend upon another object in a chain linking level to level.

The prior art teaches propagation of attribute values downward in such chains. Returning to the example of word processing texts, the opening of a word processing text file automatically embraces certain default attribute values established by the parent object, here the word processing program. This is the conventional approach for dealing with object attribute values, which allows for inheritance of those properties by subobjects of an object. This scheme of object values propagation is limited to one way inheritance, downwards in an object hierarchy. The scheme does not permit propagation of attribute values within a level among objects of the same object type. Nor does the prior scheme permit propagation of attribute values among arbitrarily co-categorized objects.

Thus, it is one object of the present invention to provide a method of enhancing propagation of object attribute values among objects in a data processing system.

It is another object of the present invention to provide a method for enhancing access to attribute values for an object type on a particular level in a data hierarchy.

It is yet another object of the invention to provide a method for defining propagation groups for particular object attribute values without limitation of object rank or predefined interrelationships among objects.

SUMMARY OF THE INVENTION

The present invention provides, in response to user initiation, display of object attribute values for objects of ranks higher than a current object in the data hierarchy.

The present invention provides in response to user initiation, display of object attribute values for objects ranked below the current object in a data hierarchy. In response to user initiation, changes in object attribute values are propagated both upward and downward in data hierarchy.

The present invention provides for user control of the scope of attribute value changes, in other words providing, in response to user initiation, object attribute value propagation among all objects of the same class or type within a system, including the ability to define a class.

The foregoing objects are achieved by the method and apparatus of the present invention to provide for propagation of object attribute values among objects in a data processing system. Identification of a target object within object hierarchy is made in response to user selection. The prior attribute values for the target object are then displayed on a display device. Upon user selection, new object attribute values are generated for the target object. A propagation group for the new object attribute values is made in response to user designation of relating factors and the new object attribute values are applied to all objects within the related group.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
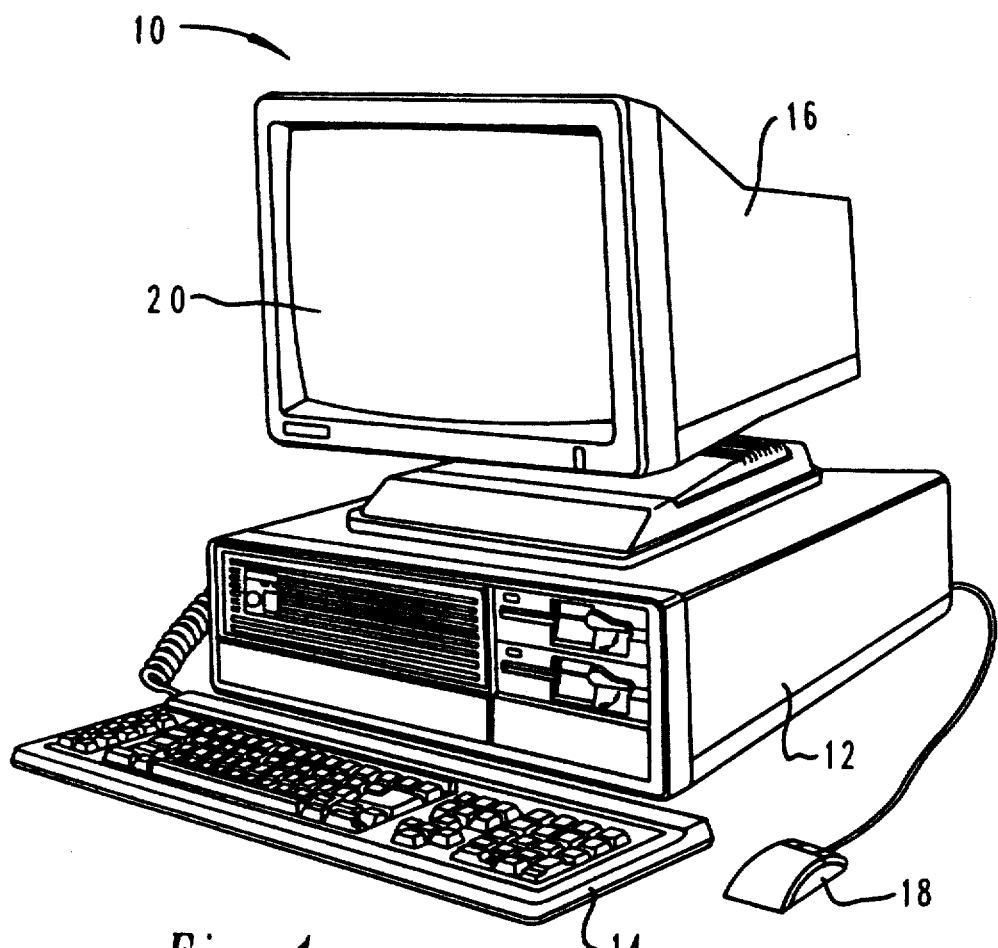
FIG. 1 is a pictorial representation of a personal computer system incorporating the present invention.

With reference now to the figures and in particular with reference to FIG. 1, there is depicted a pictorial representation of a personal computer system 10 which may be utilized in accordance with the method of the present invention. Personal computer system 10 is preferably provided by utilizing an IBM Personal System/2 ® computer. The IBM OS/2 ® operating system is incorporated into computer system 10. The IBM Presentation Manager TM graphic user interface provides for presenting to users menu selections through windows Personal computer system 10 includes a microcomputer 12, a keyboard 14, and a visual display device 16. A mouse 18 is optionally provided by positioning a mouse pointer on a of display screen 20 for selection of menu items.

Figure 2:
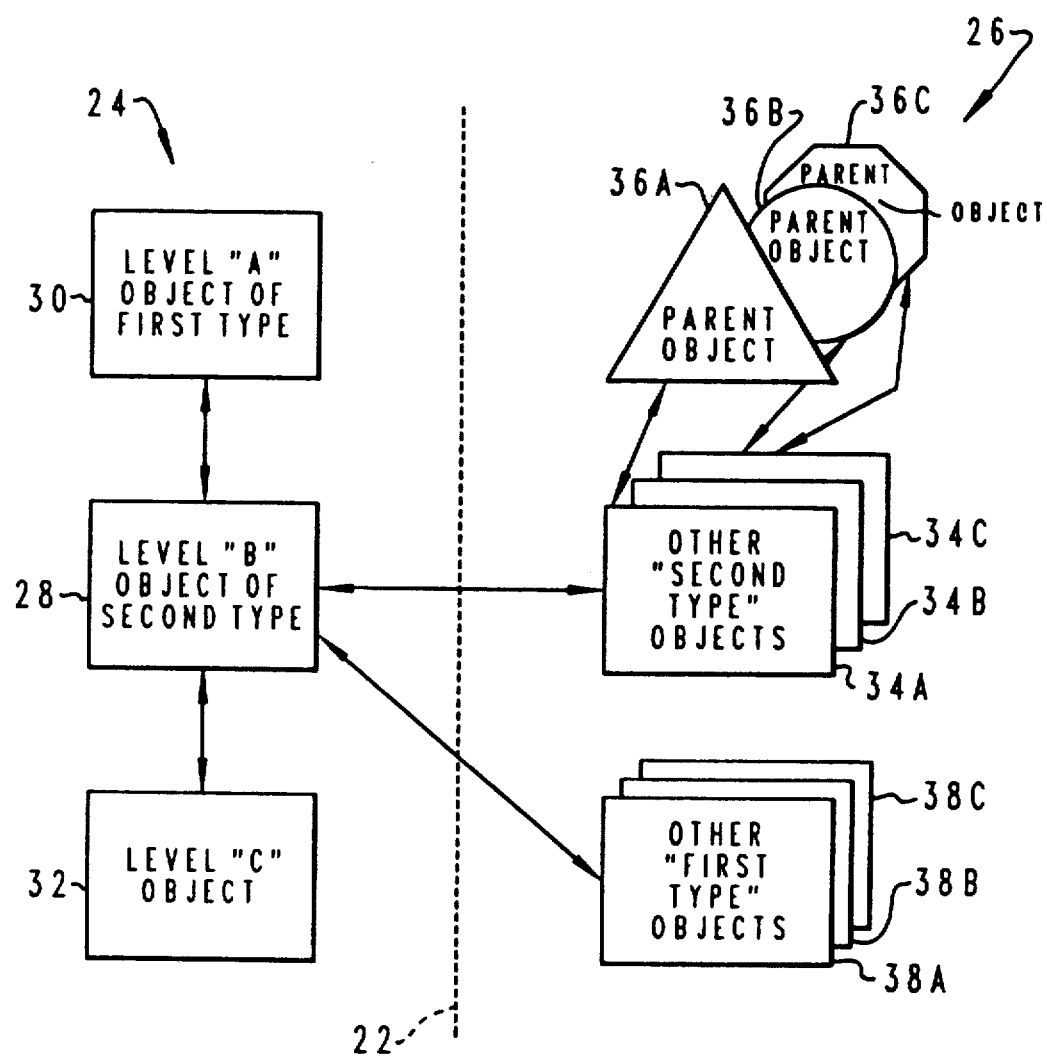
FIG. 2 is a schematic representation of possible ambits of propagation of object attribute values.

FIG. 2 is a graphical illustration of potential relationships of various data processing system objects to a target object 28. Hatched dividing line 22 graphically illustrates a logical division between a hierarchy of objects 24 including target object 28 and objects 26 not in the hierarchy of objects 24. Target object 28 has both a parent object 30 and a child object 32. Parent object 30, target object 28, and child object 32 are labeled as being of level A, level B and level C in the hierarchy, respectively. Bidirectional arrows between objects 28 and 30, and 32 and 28 indicate permissible directions of object attribute value propagation.

Object attribute values may also be propagated across division 22 from target object 28 to objects outside of hierarchy 24. The scope or range of propagation of object attribute values from target object 28 is subject to user selection. Objects 26 include objects 34A-34C, which are the same object type as target object 28, child parent objects 36A-36C to objects 34A-34C. Parent objects 36A-36C are of different types from one another. An example where one object type can have parents of differentiated object types is a word processing document which is subject to access and control through a spread sheet program, a database program, or a word processing program. In other words, where parent object 36A is a word processing program, parent object 36B could be a database manager and parent object 36C could be a spread sheet manager. The respective subobjects 34A-34C could all be word processing documents.

Objects 38A-38C are of the same type as parent object 30. However, they exist outside of the hierarchy 24 of target object 28. Object attribute values applied to target object 28 may be propagated from object 28 to objects 38A-38C, or received therefrom.

Figure 3:
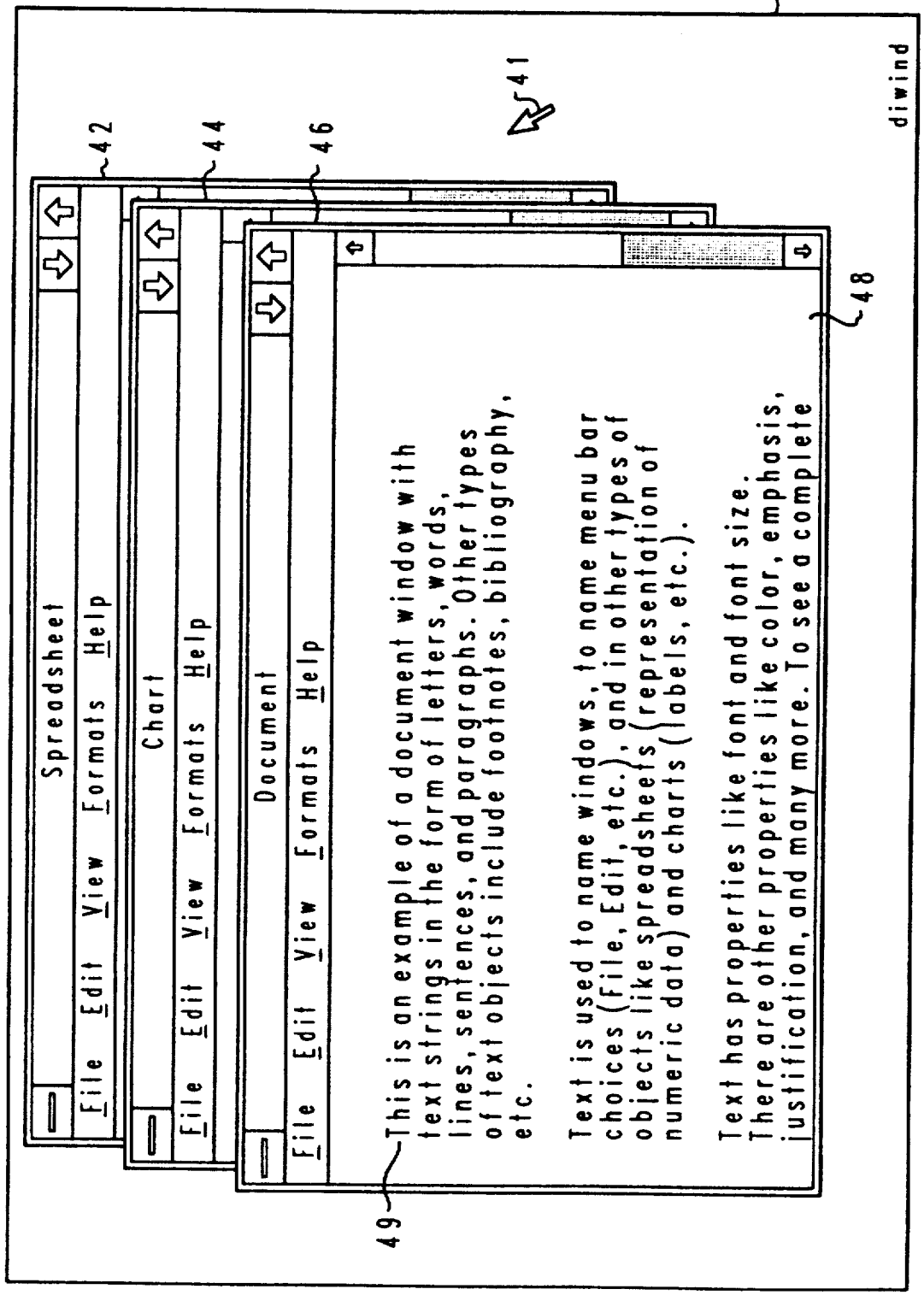
FIG. 3 is a pictorial representation of a plurality of windows within a computer display screen.

FIG. 3 depicts a pictorial representation of a computer display screen 40 upon which are displayed three windows 42, 44, and 46. Those skilled in the art of multitasking computer applications will appreciate that each window may represent an object opened for editing through use of a single application program such as a spread sheet program, a word processing application, or a graphics application. Windows 42, 44 and 46 may be displayed in an overlapping sequence which is dependent upon the order in which the applications were opened. Here window 42 is opened first followed by window 44 and finally window 46. A mouse pointer 41 may be repositioned on display screen image 40 to select or deselect an application or to select choices from the menu bars of each of windows 42, 44 and 46. Windows 42, 44 and 46 include display fields, with display field 48 of document window 46 being shown. Display field 48 of document window 46 may be entered to manipulate the contents or data of the object mapped into display window 48. As illustrated, the data represents a text string 49.

Figure 4:
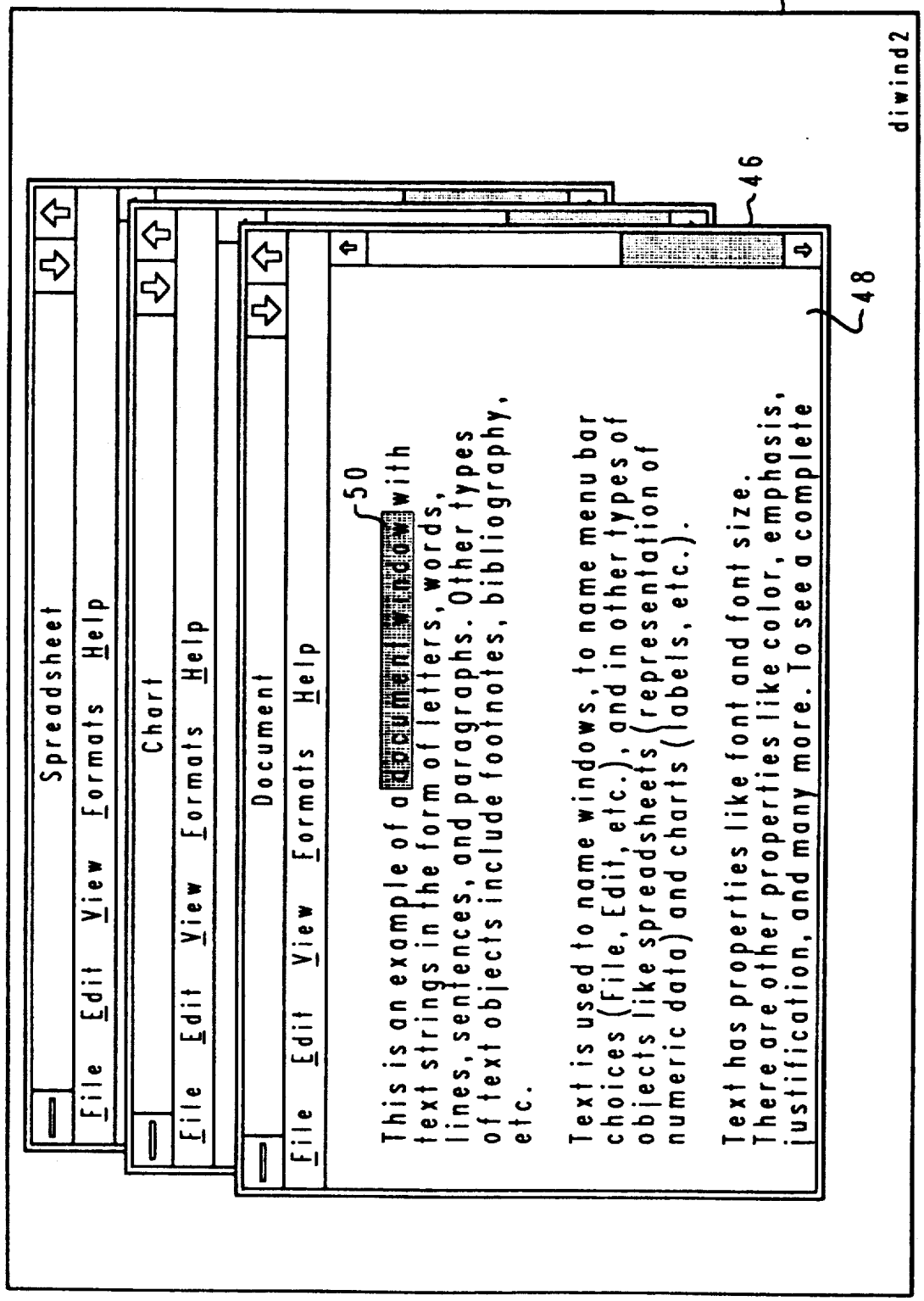
FIG. 4 is pictorial representation of the plurality of windows within a computer display screen of FIG. 1 after identification of a target object.

FIG. 4 depicts a pictorial representation of computer display screen 40 wherein a text object consisting of the words "document window" has been highlighted in box 50. The contents of box 50 thus become a target object the data in which represents words and the attributes of which include font, font size, background color and emphasis among other attributes. Values for the attributes of the document example are inherited. The values for these attributes are subject to change.

Figure 5:
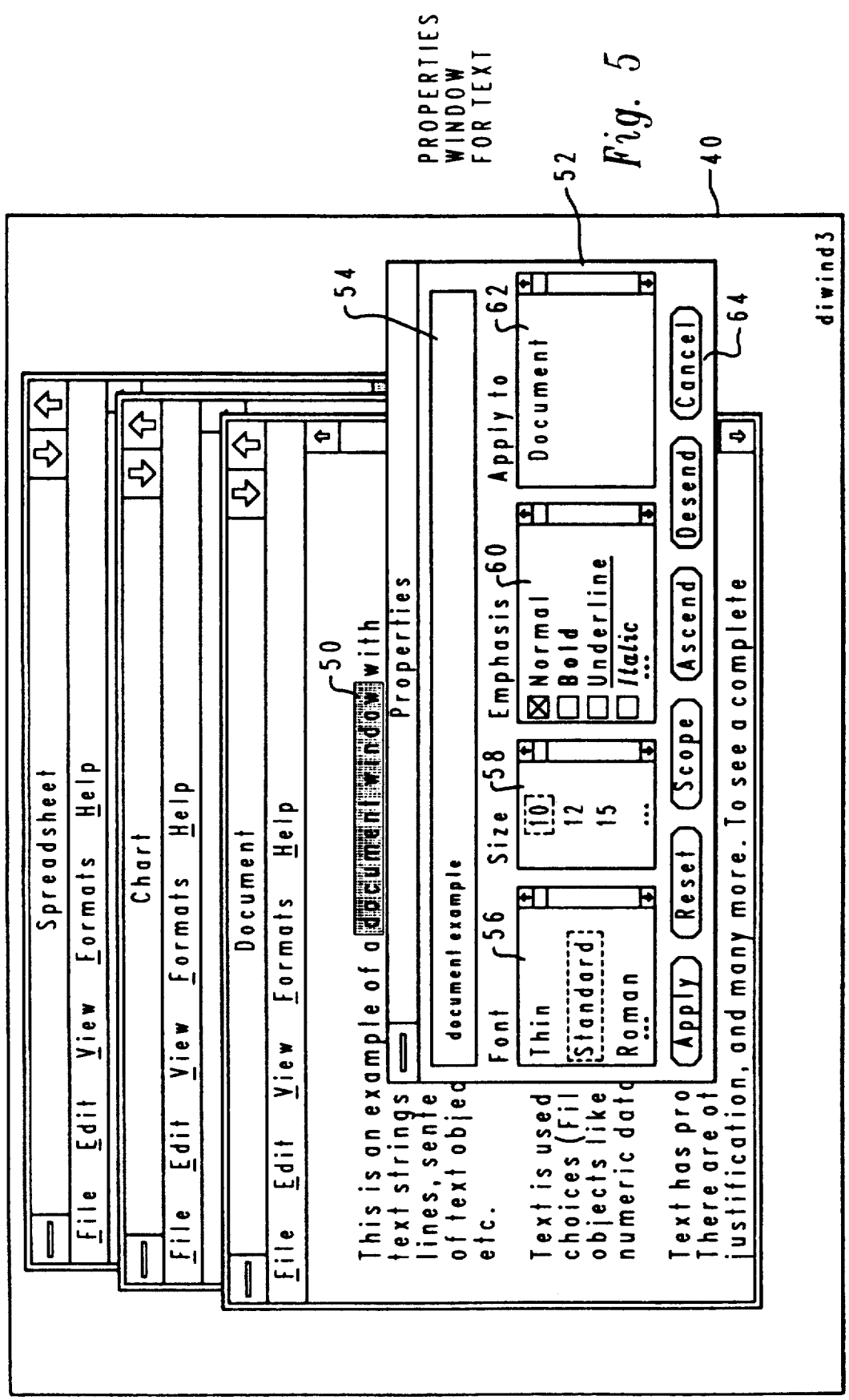
FIG. 5 is a pictorial representation of the a plurality of windows within a computer display screen after display of object attribute value for the target object in FIG. 4.

FIG. 5 illustrates a display screen image 40 wherein a properties window 52 has been opened for target object 50 which is identified in an identification bar by the name "document example". Attribute values for font, type size and emphasis may be modified through entry fields 56, 58 and 60 respectively. A default scope for propagation of changes in attribute values is indicated in a display field 62. Control of the propagation of any change in attribute values controlled by accessing the appropriate item from among push buttons 64.

Figure 6:
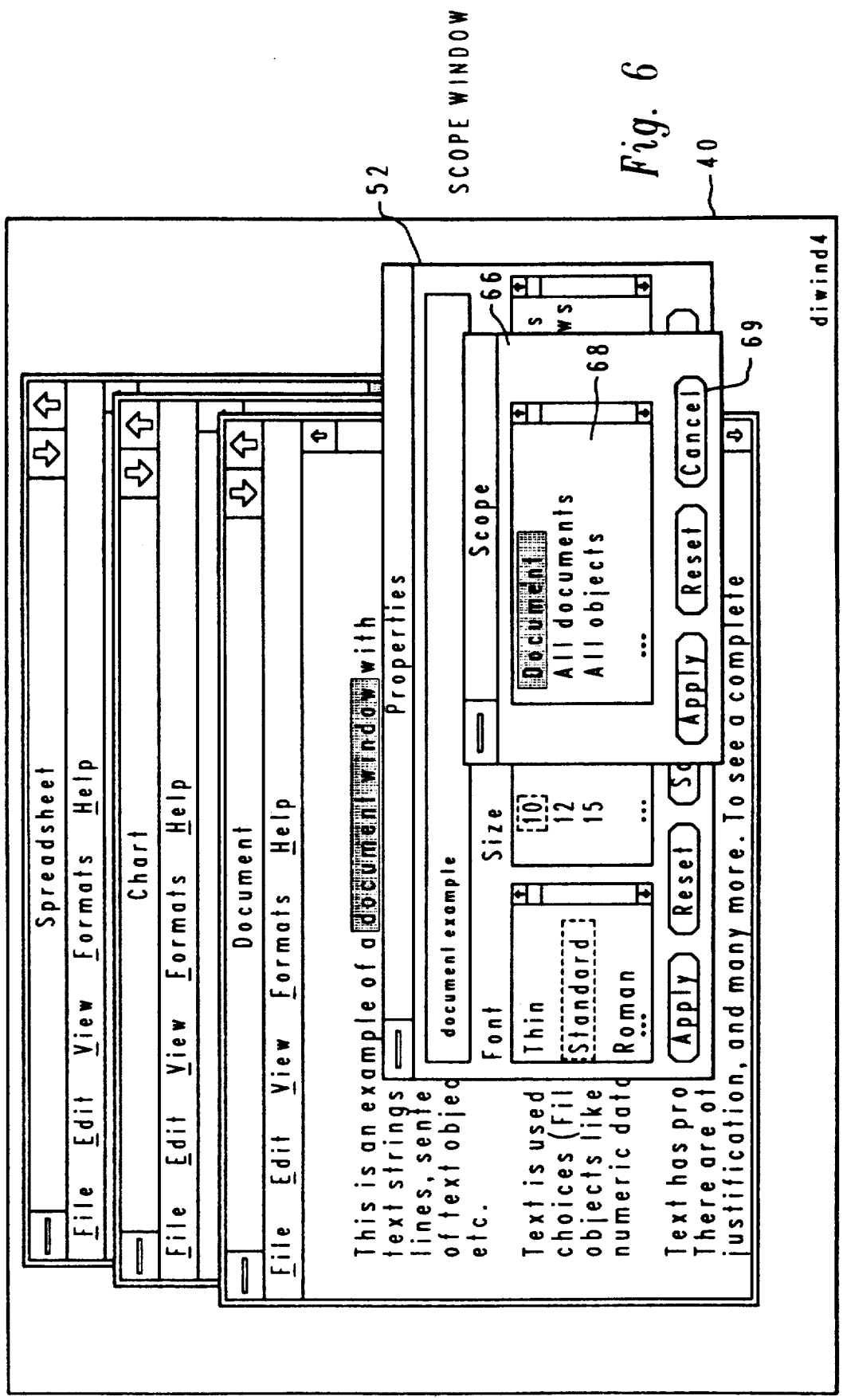
FIG. 6 is a pictorial representation of a plurality of windows within a computer display screen after selection of an object attribute value scope of propagation option.

FIG. 6 depicts display screen image 40 as modified by opening of a scope window 66 by selection of the scope item from push buttons 64 in FIG. 5. Scope window 66 includes a propagation scope selection field 68. Selection of documents to which changes in object attribute values may be propagated after their selection through properties window 52 and a menu bar 69 is made through selection field 68.

Figure 7:
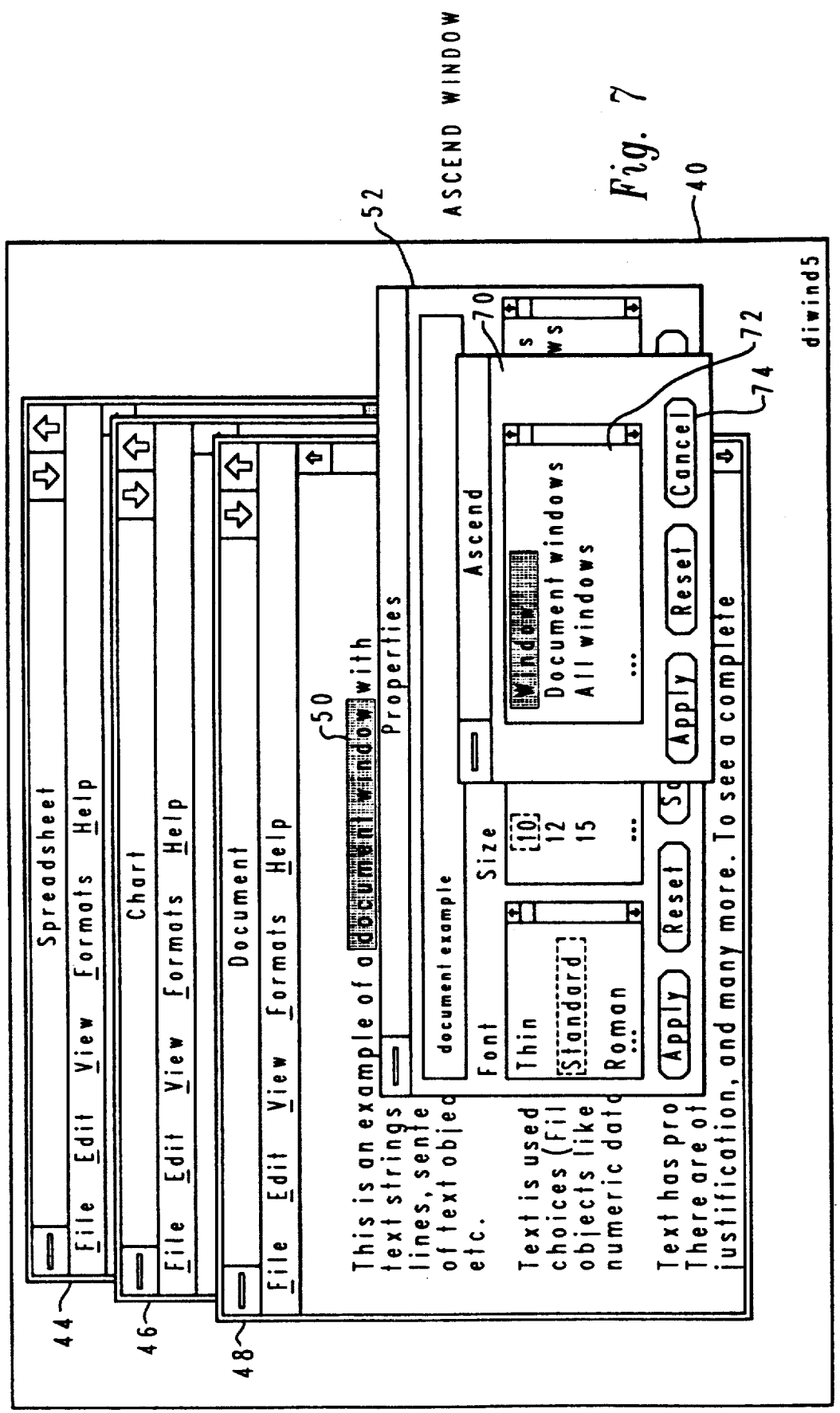
FIG. 7 is a pictorial representation of a plurality of windows within a computer display screen after selection of a hierarchical propagation option.

FIG. 7 depicts in pictorial representation a display screen image 40 on which an ascend propagation window 70 has been opened. Ascend propagation window 70 relates to selection of a propagation scope upward in an object hierarchy. In the illustrated example, a child object document window 50 has a parent object in document window 48. Document window 48 is opened over chart window 46 and chart window 46 is opened within spread sheet window 44. A hierarchy object chain with the spread sheet window 44 object being senior parent object in the chain and having as an immediate child the object within chart window 46 and as a grandchild the object opened through document window 48 is assumed for purpose of this example. The scope of propagation can be selected through propagation selection field 72. Push buttons 74 are available for control of the operations accessible through window 70.

Figure 8:
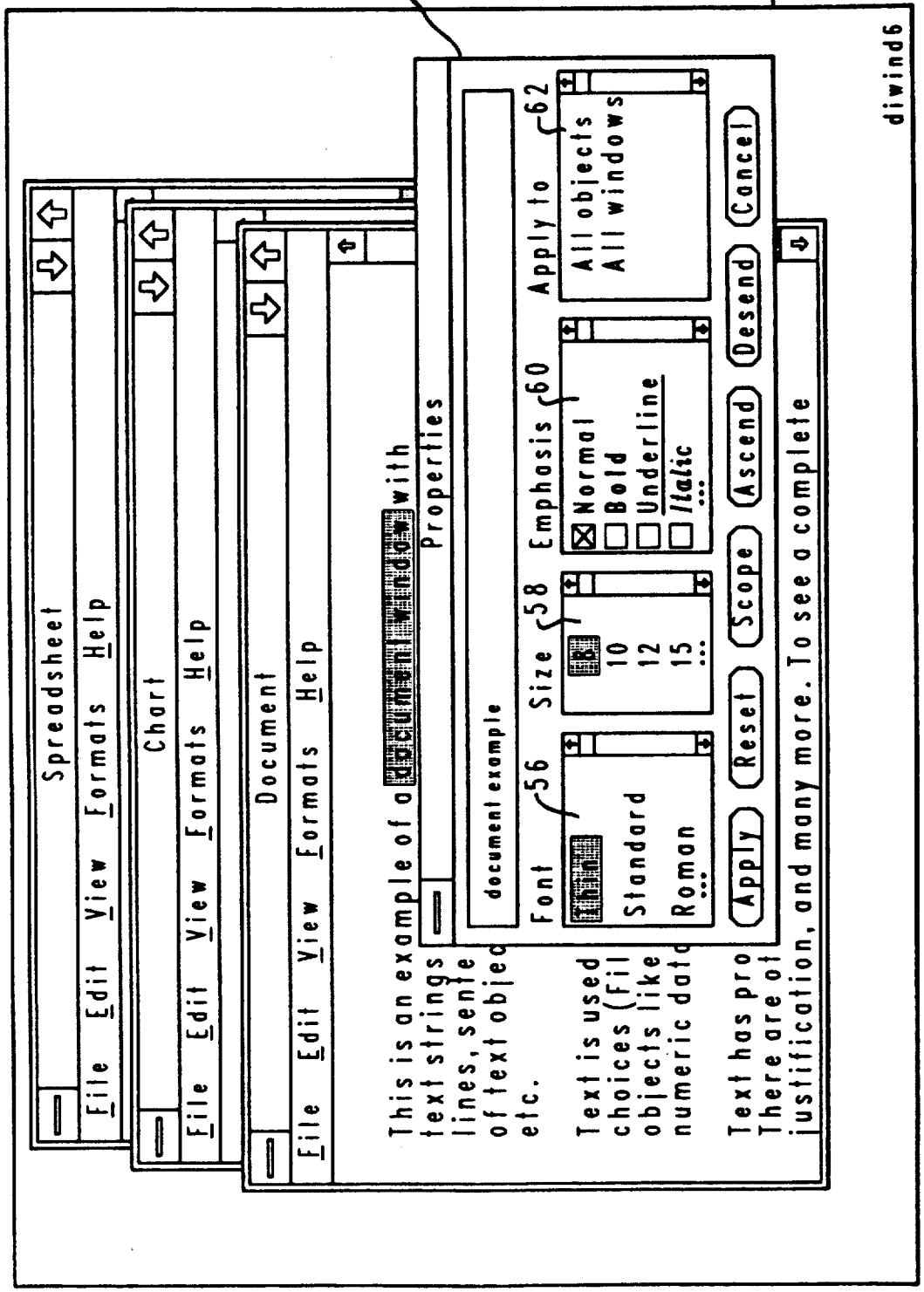
FIG. 8 is a pictorial representation of a plurality of windows within a computer display screen illustrating selection of new object attribute values and a scope of propagation for those values.

FIG. 8 illustrates a pictorial representation of a display screen image 40 wherein various object attribute values have been selected through selection fields 56, 58 and 60 and a scope of propagation is indicated in display field 62, e.g., "all windows" meaning objects opened in screen image 40. The changes illustrated in FIG. 8 from FIG. 3 include a change in font value from "standard" to "thin" and a change in font size values from "10" to "8".

Figure 9:
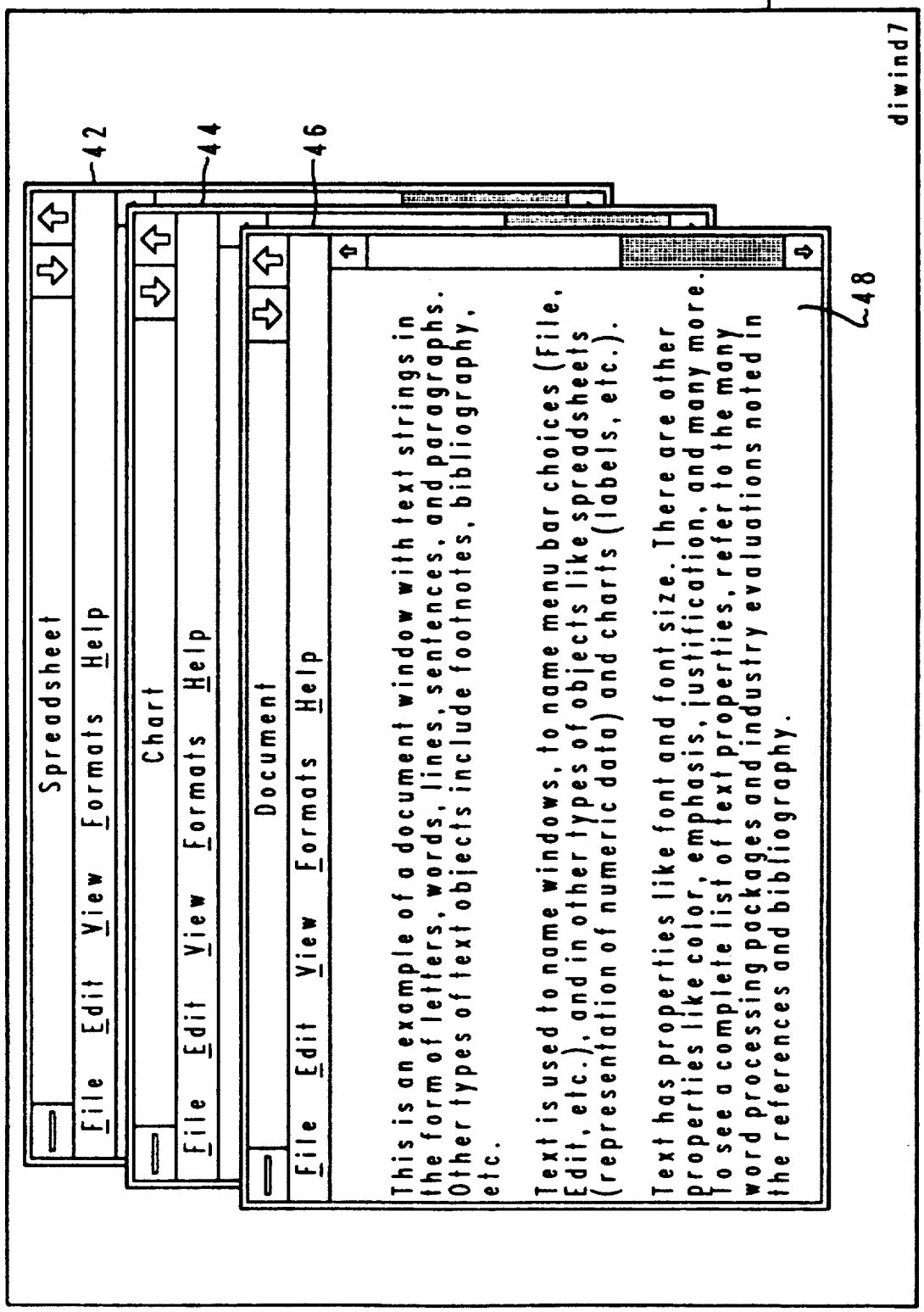
FIG. 9 is a pictorial representation of a plurality of windows after selection of new object attribute values.
Figure 10:
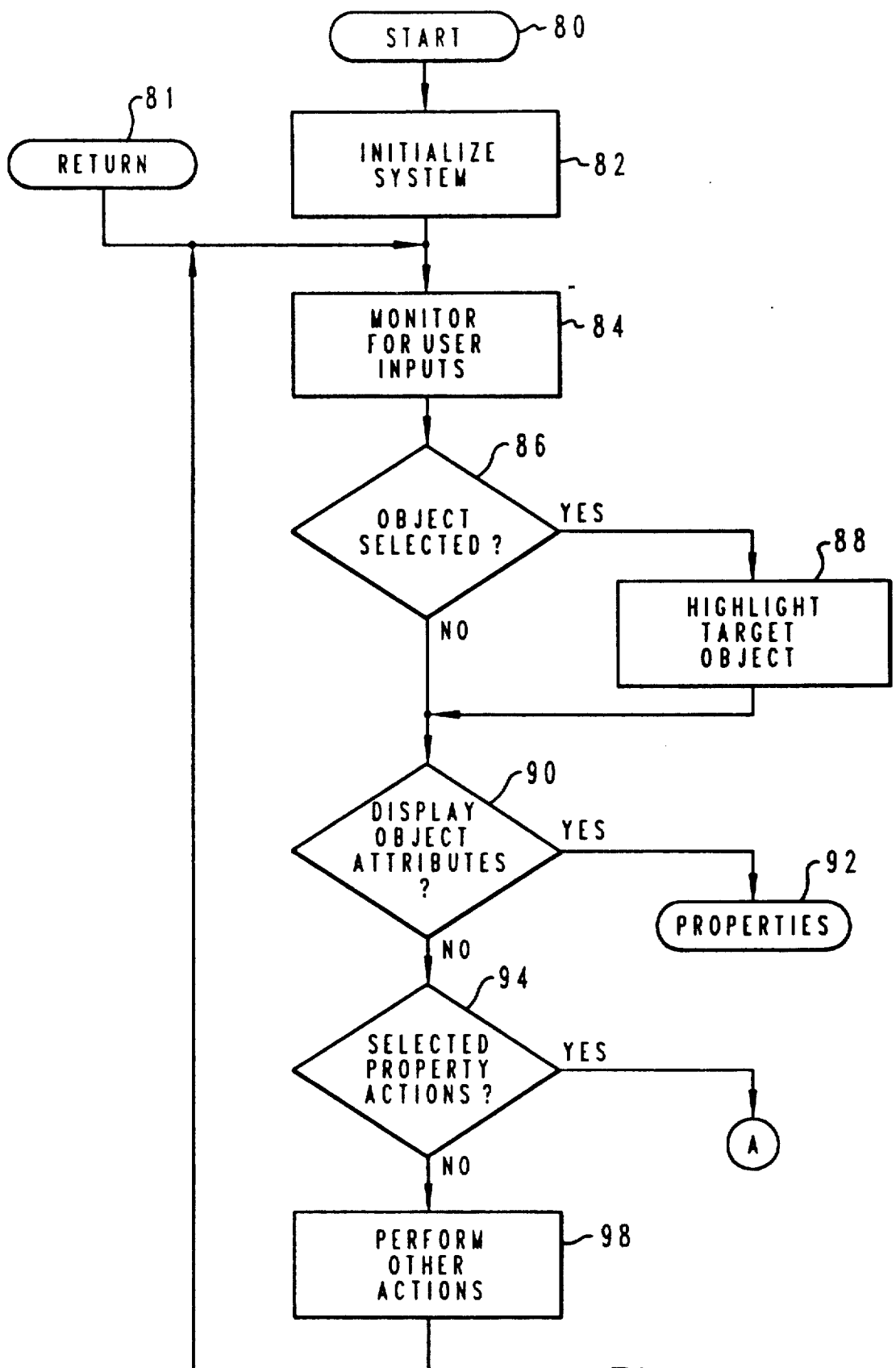
FIG. 10 is a logic flow diagram relating to the method of the present invention.

FIG. 9 illustrates the results of application of the object attribute values across the scope indicated in FIG. 8. Because the headers to windows 42, 44 and 46 are also text, and because the scope of propagation includes the objects represented by windows 42–46, the font and font size selections apply to the headers, as well as the objects opened in their respective display fields.

With reference now to FIGS. 10-18 there are depicted logic flow diagrams which illustrate the method of the present invention. The process begins with block 80 upon powering up of computer 12. Personal computer system, 10 is initialized at block 82 with the loading of an operating system and potentially various application programs used for manipulation of data objects within data processing system 10. Next, at step 84 the data processing system waits for some user action relating to changes in object attribute values subject to possible propagation. Next, at decision block 86 it is determined whether a target object has been identified. If a target object has been identified the target object is highlighted in display image upon processing of block 88. Next, at decision block 90 it is determined whether a user has requested display of object attribute values. If a user request has been received processing advances to a properties manipulation subroutine by block 92. If the display of object attribute values has not been requested, it is next determined, at decision block 94, whether a user has selected some other action regarding object attribute values. If the user has selected another action, processing advances to the properties manipulation subroutine at letter A. If no other, object attribute values operations have been selected, the user input, detected is presumed related to some other operation for performance on a computer. Computer response to such request is indicated at block 98 from which processing is returned to block 84 to await the next user request.

Figure 11:
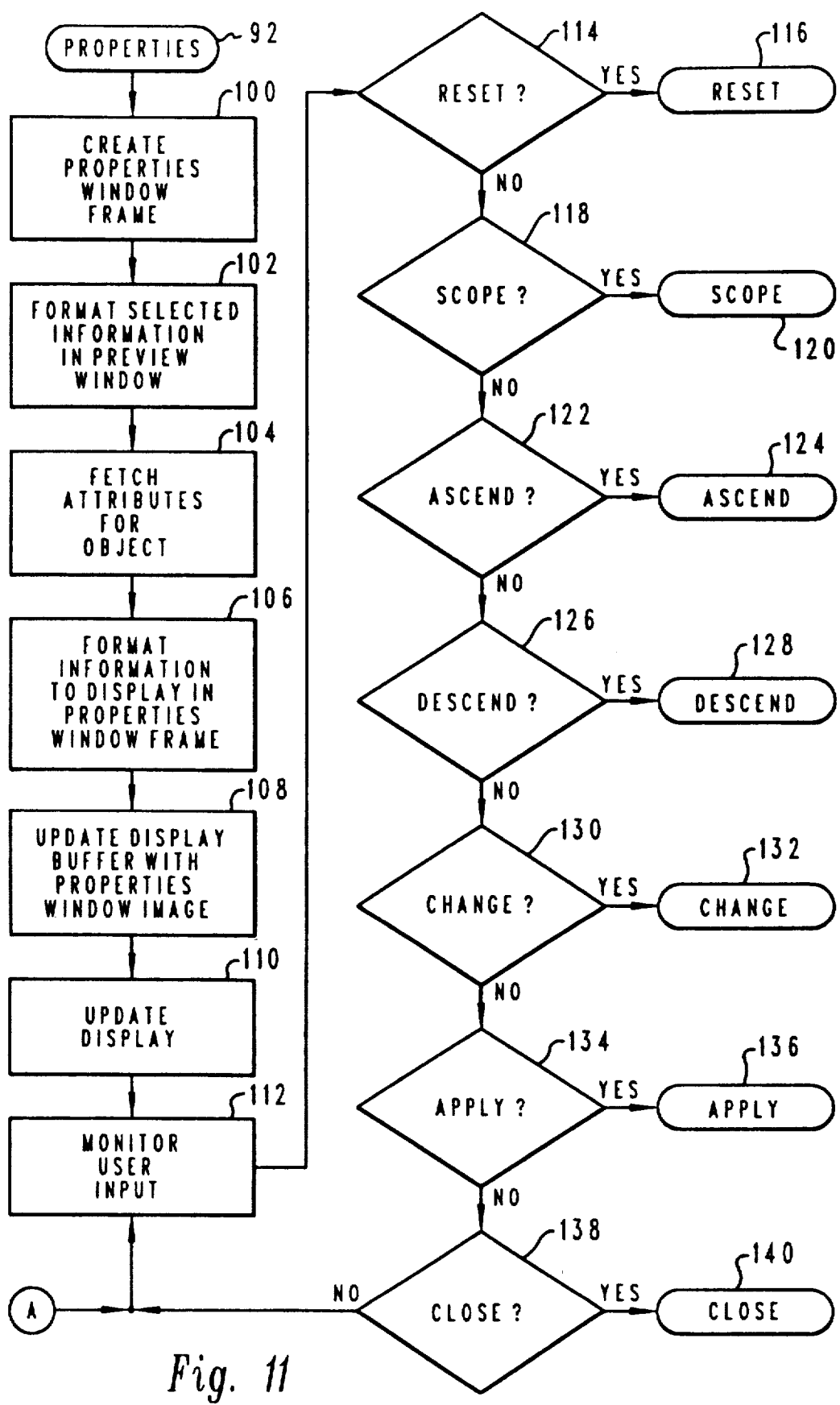
FIG. 11 is a logic flow diagram relating to the method of the present invention.

FIG. 11 depicts a properties manipulation subroutine starting at block 92 and alternatively entered at letter A to block 112. From block 92, blocks 100–110 relate to display of object attribute values for a target object. First a properties window frames is created at block 100. Next, information relating to the object is formatted for display in a preview window at block 102. Next, attributes for the target object are fetched from memory at block 104. Next, information dedicated for display in the properties window frame is formatted at block 106. Next, at block 108 the window image data is transferred to the display buffer for visual display device and at block 110 the window image data is used to update the actual display viewed by the user.

Next, at block 112 monitoring for specific user inputs relating to changes in an object's attribute values occurs. Next, at decision block 114 it is determined whether the user input is a selection of a "RESET" action. If the result is positive, processing proceeds to the "RESET" routine through block 116. If the result is negative, processing proceeds to block 118 where it is determined whether a user has selected the SCOPE action. If the SCOPE action has been selected processing proceeds to the SCOPE routine through block 120. Otherwise, processing proceeds next to decision block 122 where it is determined if the user has selected the ASCEND action relating to object attribute value propagation upward in hierarchy chain. If the result is positive, processing proceeds to the ASCEND subroutine through block 124, otherwise processing proceeds next to decision block 126. At block 126 processing determines whether a DESCEND action has been selected. If the DESCEND action is selected processing proceeds to the DESCEND subroutine at block 128. If the DESCEND action has not been selected processing proceeds next to decision block 130 to determine if a change in object attribute valuation has been requested. If the CHANGE action has been selected processing proceeds to the CHANGE routine at block 132. If the CHANGE action has not been selected, processing proceeds next to decision block 134 where it is determined if an APPLY action has been selected. If the APPLY action has been selected processing proceeds to that routine at block 136. If the APPLY action has not been selected processing proceeds next to block 138 Where it is determined if the user selected the CLOSE action from a menu. If the CLOSE action has been selected processing proceeds to block 140. If the CLOSE action has not been selected processing is fed back to monitor for another user input at block 112, the user having apparently selected a non-permitted item.

Figure 12:
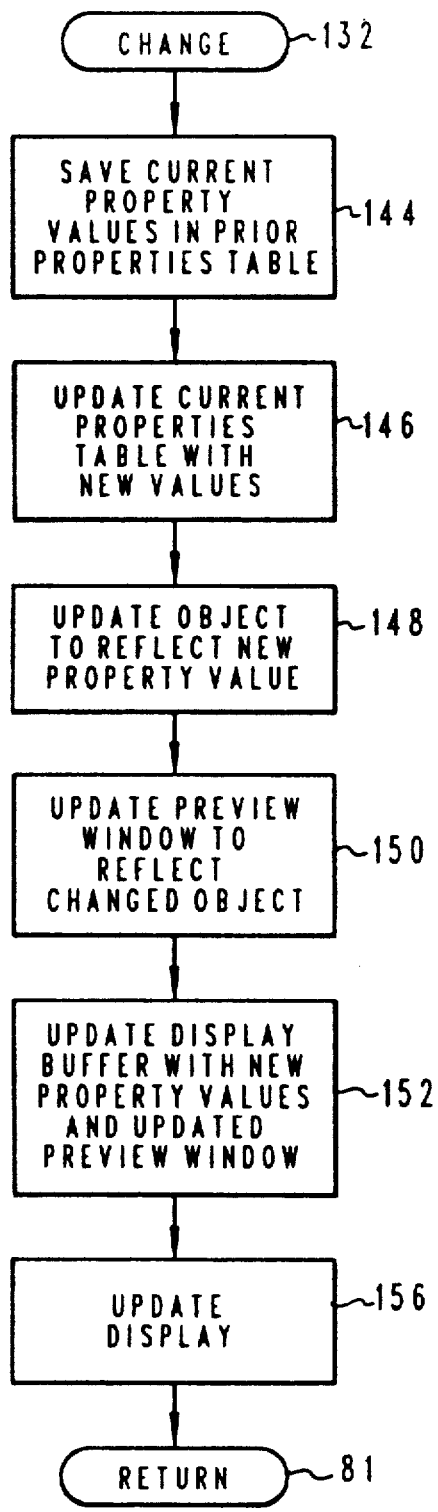
FIG. 12 is a logic flow diagram relating to the method of the present invention.

FIG. 12 depicts a flow chart for an object attribute value CHANGE routine. Processing begins with block 132 and proceeds to block 144 where current object attribute values are saved to a prior properties table in memory. Next at block 146 newly entered object attribute values are entered into a current properties table. Next, at operations block 148 the target object is updated to reflect the new object attribute values. Next at block 150 a preview Window is updated to reflect the changed object attribute values. Next at block 152 the display buffer is updated with the new object attributes values and an updated preview window. Next at block 156 the display image itself is updated to reflect the changes in object attribute values. From block 156 processing is returned to the main routine of FIG. 10 and block 84.

Figure 13:
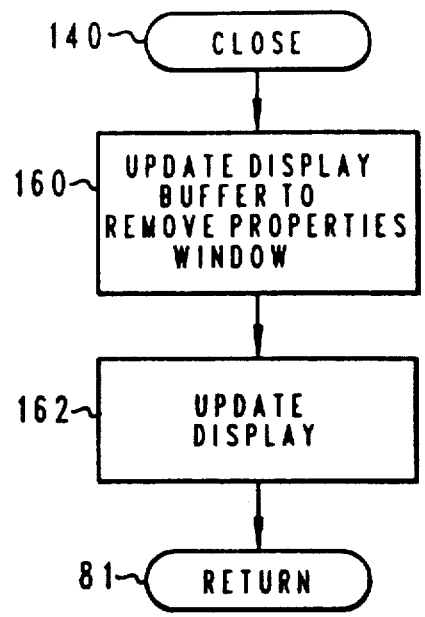
FIG. 13 is a logic flow diagram relating to the method of the present invention.

FIG. 13 depicts the logic flow diagram for a close routine 140. The close routine provides for closure of the properties window. From block 140 processing proceeds next to block 160 wherein the display buffer is updated to remove the properties window. Next, at block 162 the display itself is updated to erase the properties window and return processing to the underlying object. Processing returns to block 84.

Figure 14:
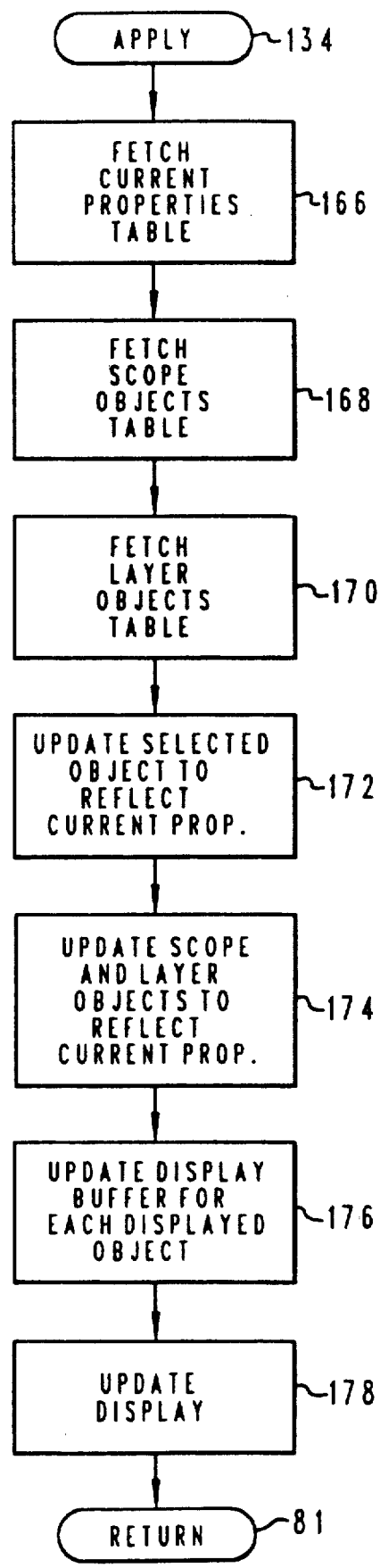
FIG. 14 is a logic flow diagram relating to the method of the present invention.

FIG. 14 illustrates an apply routine 134, which relates to application of a propagation scope for a set of object attribute values. Processing starts at block 134 and proceeds therefrom to block 166 where the table of current object attribute values is fetched. Next, at block 168 the object scopes table is fetched. Next, at operation block 170 a layer objects table is fetched. Next, at operation block 172 a targeted object is updated to reflect properties from the current object attribute values table. From block 172, block 174 is executed to update the scope and layer objects to reflect the same current object attribute values. Next, operation block 176 and 178 are processed to cause the display to reflect changes made in block 166-174. Processing is then returned to block 84 via the return step of block 81.

Figure 15:
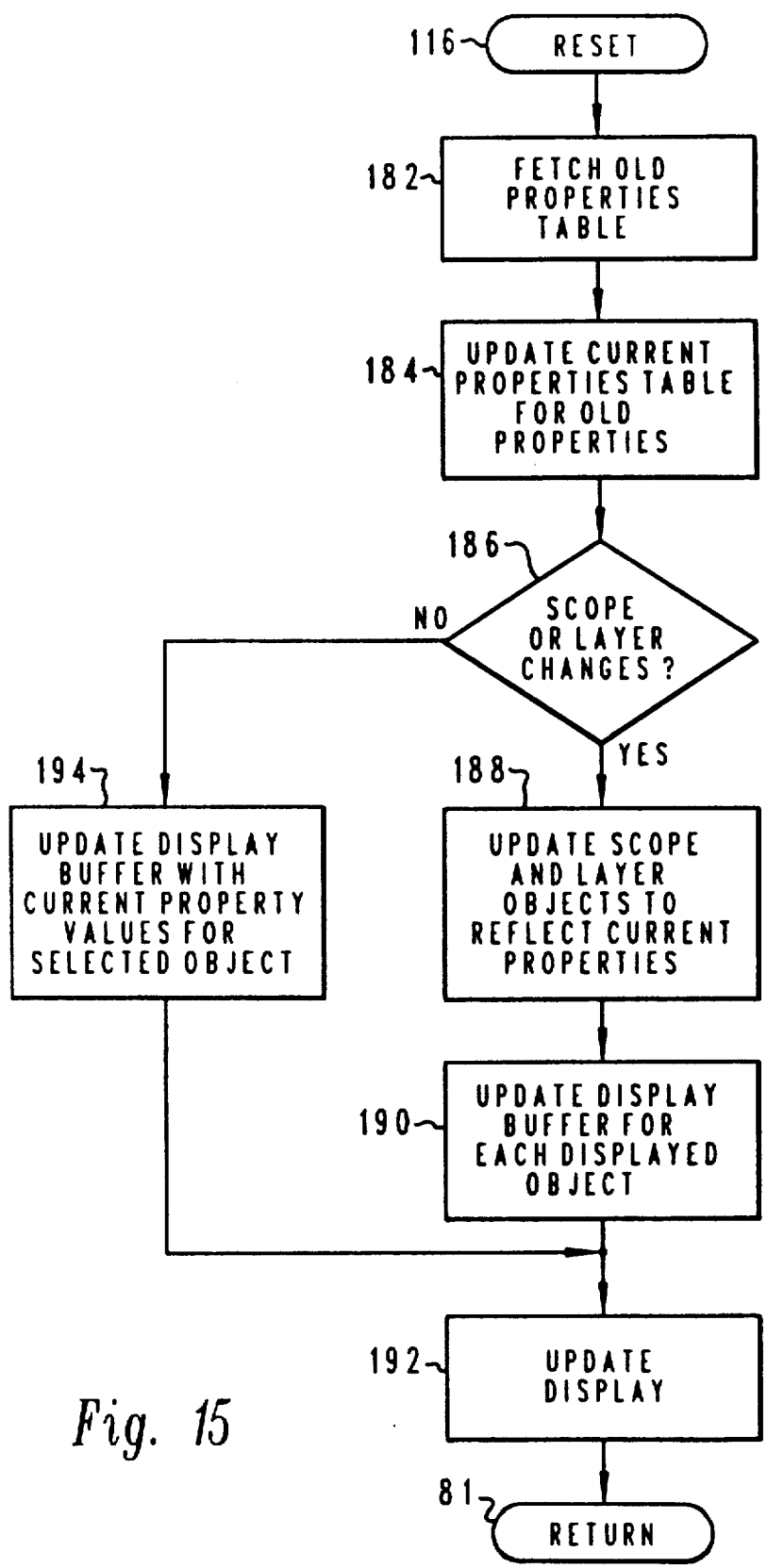
FIG. 15 is a logic flow diagram relating to the method of the present invention.

FIG. 15 depicts a logic flow diagram relating to a RESET routine 116 which is utilized to restore the state of attribute values next preceding the most recent change for an object. From block 116, block 182 is executed to fetch object attribute values from an old properties table. Next, at operation block 184 the prior object attribute values are read into the current properties table. Next, decision block 186 determines whether the user wishes to propagate the old properties through a set of other objects. If no scope or layer changes are required operation proceeds next to blocks 194 and 192 which provide for update of the display to the user. If scope or layer changes are indicated those changes are made by processing block 188 and 190 which relate respectively to updating the scope or layer objects to reflect the changes in the current properties table and update of the display for all displayed objects. Operation is returned to the monitor block 84 by the return block 81.

Figure 16:
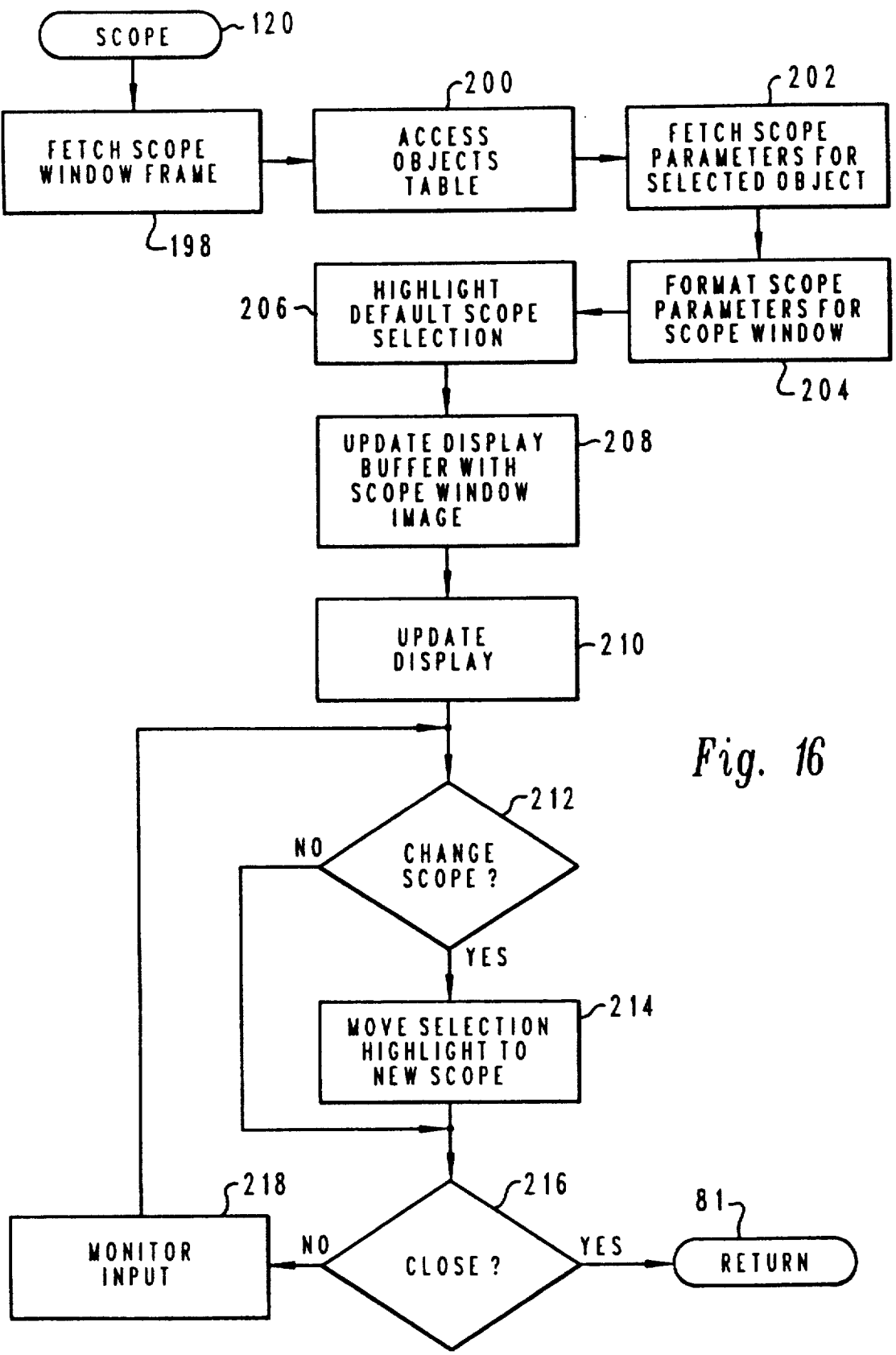
FIG. 16 is a logic flow diagram relating to the method of the present invention.

FIG. 16 depicts a logic flow diagram for a scope routine 120 which relates to definition of a propagation group. Processing starts at block 120 and proceeds to block 198 where the propagation scope window frame is fetched from memory. Next, block 200 indicates that an objects table is accessed to identify a target object as a source for object attribute values. Next, at operation block 202, scope parameters for the targeted object are fetched. Next, at operation block 204 the scope parameters are formatted for display in the scope window frame. Next at operation block 206 the default scope parameters are highlighted and at block 208 and 210 the display is updated to reflect the scope window and default scope selections.

The user may decide at this point not to change the scope of propagation of the object attribute values or not. Accordingly the routine next determines at decision block 212 whether the user has elected a change in scope. Upon selection of a new scope those parameters are highlighted at block 214 and the routine determines whether the user wishes to now exit the routine at block 216. If no change in scope has been elected, processing proceeds directly to block 216 to determine whether the user has elected to exit the routine. As long as the user does exit the routine, processing returns to decision block 212 via block 218, which reflects continued monitoring for user inputs. Once the routine is exited operation returns to block 84 via return block 81.

Figure 17:
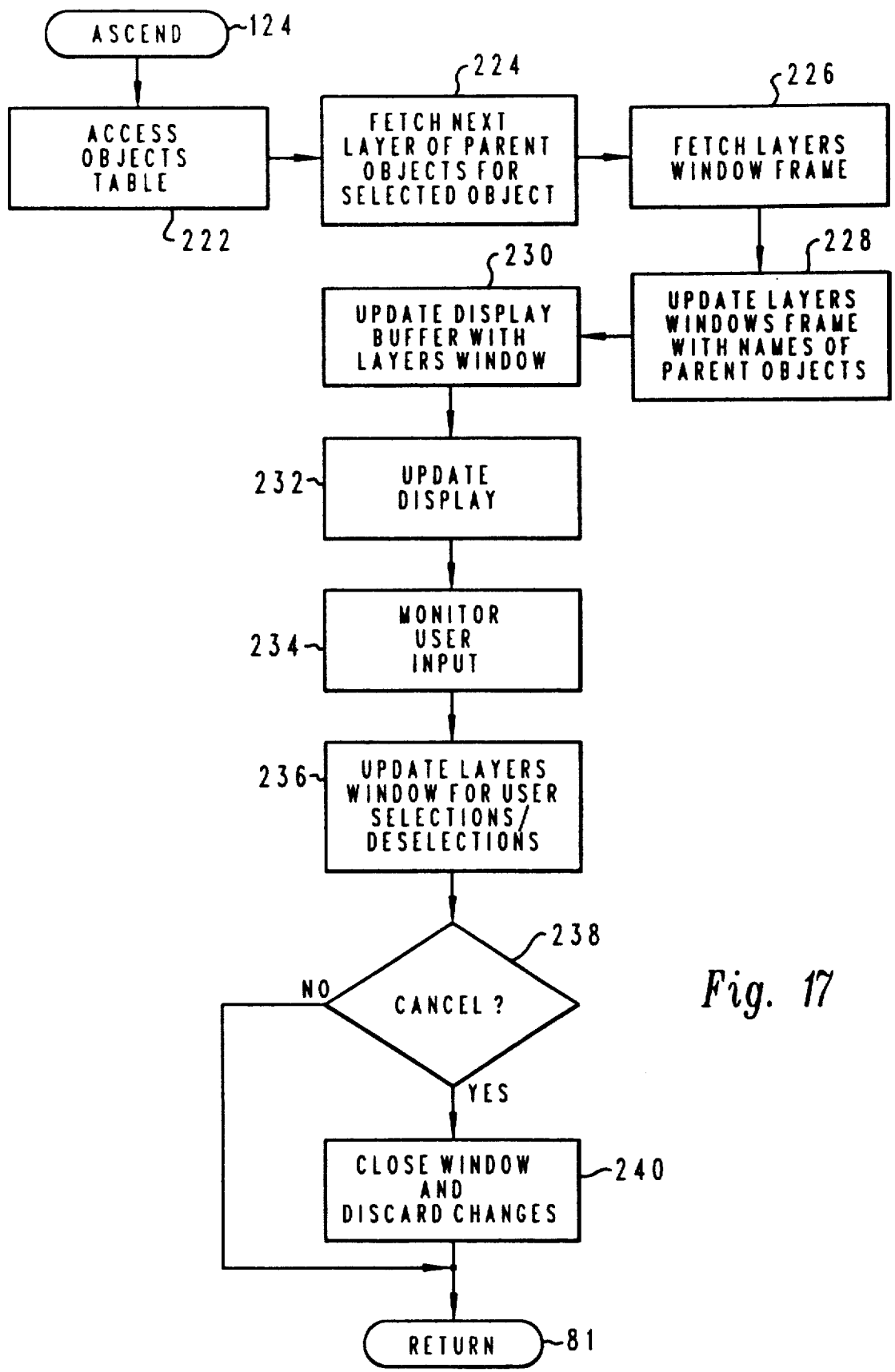
FIG. 17 is a logic flow diagram relating to the method of the present invention.

FIG. 17 illustrates a logic flow diagram relating to propagation of object attribute values upward in a hierarchy chain. Processing of the ASCEND routine is started at block 124 Next, at operation block 222, an objects table is accessed to identify a target object. Next, parent objects for the targeted object are fetched from memory. Next, at block 226 a layers window frame for parent object layers is fetched. Next, at block 228, layers window frames are identified with the name of the parent objects for the target object. Next, at blocks 230 and the display image is updated to reflect the retrieval of the layers with the parent objects. Next, block 234 reflects the computer waiting for further user inputs Next, at block 236 the layers window frame is updated to reflect user selections or deselections made at block 234. Next, at block 238 the user can determine whether to accept the selections or deselections. If the changes are rejected, processing proceeds at block 240 where the window is closed and the changes are discarded. Next processing proceeds to return block 81. If the changes are accepted return to block 84 is direct.

Figure 18:
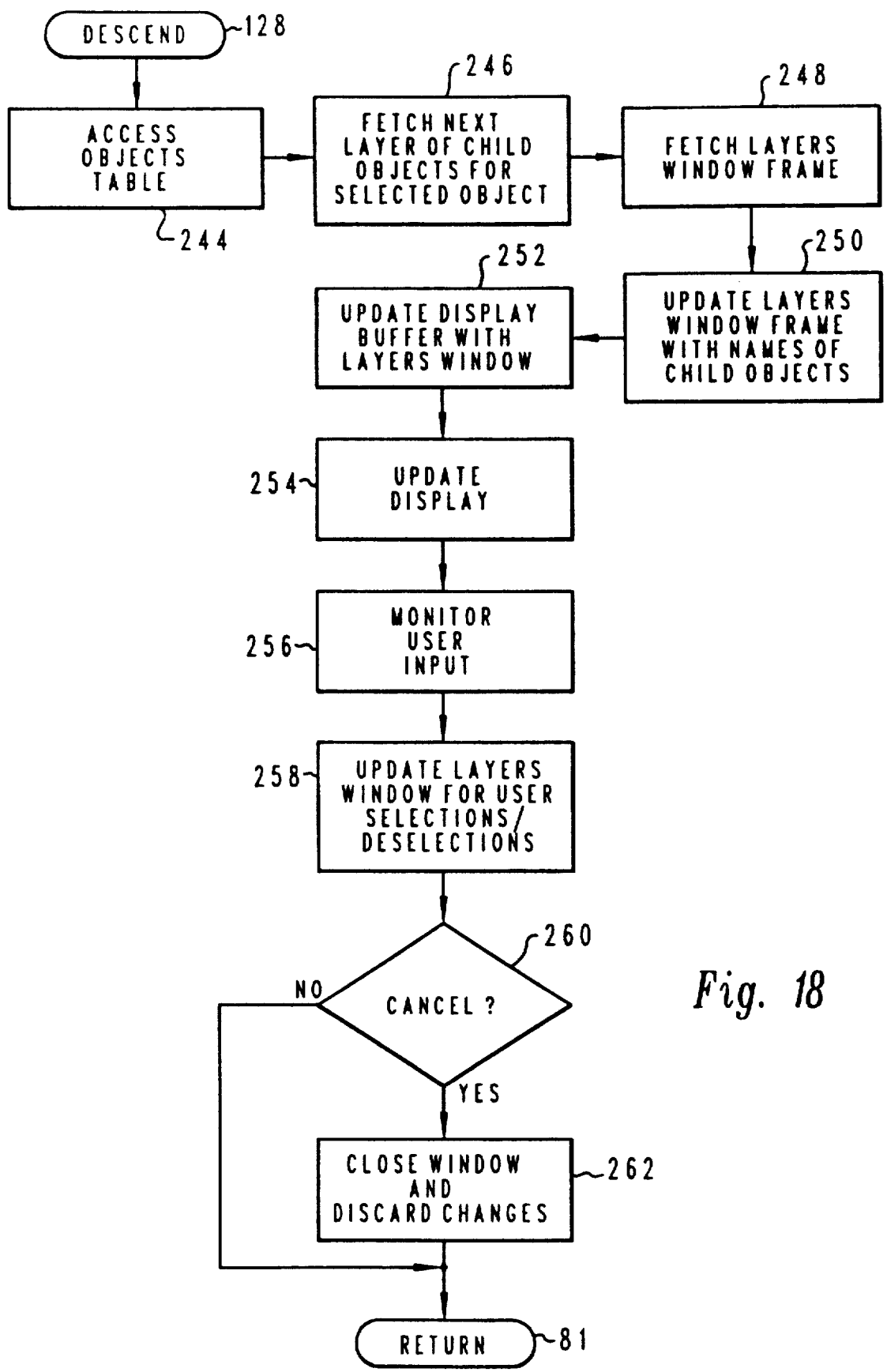
FIG. 18 is a logic flow diagram relating to the method of the present invention.

FIG. 18 depicts a logic flow diagram for a DESCEND routine 128, which relates to propagation of object attribute values from a target object downward in a hierarchical chain. From block 128 an object table is accessed at block 244 to identify a target object. Next, at block 246 the next layers of children objects for a targeted object are fetched. Next, at block 248, a layers window frame for display of object attribute values is fetched. Next, at block 250 a layers window frame is updated with the names of the child objects. Next, at block 252, display buffer is updated with the current layers window. Next at block 254 the layers window is displayed. Next, block 256 reflects the computer waiting for user inputs relating to propagation of object attribute values. At block 258, layers window is updated to reflect user selections or deselections entered at block 256. Next at decision block 260 the user can determine whether to accept or reject the changes. If the changes are not selected the window is closed and the changes are discarded at block 262. From there both paths from decision block 260 again merge and processing is returned to block 84 via return block 81.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A computer implemented method of controlling presentation of data objects on a display device for a data processing system, the method comprising the steps of:
   executing a plurality of applications and generating a plurality of data objects thereby;
   storing the data objects in a data storage facility;
   generating display attribute values for at least a first data object stored on the data processing system;
   generating a propagation scope field of data objects for a plurality of applications for user selection of data objects for a propagation group of data objects;
   responsive to user selection of the propagation group, setting display attribute values for the propagation group of data objects from display attribute values for the first data object; and
   displaying a data object belonging to the propagation group through a window on a display device using the display attribute values set in the previous step.

2. A method (performed by a data processing system in propagating object attribute values among a group of objects) as set forth in claim 1 wherein the step of generating display attribute values further comprises:
   providing default display attribute values for at least the first data object;

responsive to user selection generating an attribute display window; and monitoring a user input device for user modification of the default display attributes displayed in the attribute display window.

3. A method as set forth in claim 2, wherein the step of generating a propagation scope field for user selection of data objects of the propagation group of data objects includes:

responsive to user selection, assigning data objects to the propagation group based on position in an object hierarchy above the first data object;

responsive to user selection, assigning data objects to the propagation group based on position in an object hierarchy below the first data object;

responsive to user selection of display attribute values, assigning data objects to the propagation group based on the commonalty of display attributes between the first data object and other data objects;

responsive to user selection, assigning data objects to the propagation group where the data objects are members of a single class; and responsive to user selection, assigning data objects of a single type to the propagation group.

4. A method as set forth in claim 3, and further comprising;

responsive to user selection, displaying display attribute values within an object hierarchy including the first data object.

5. A data processing system for displaying the content of data objects through windows opened on a display device, the data processing system comprising:

storage for data objects;

means for executing a plurality of applications and generating data objects thereby;

means responsive to generation of data objects for storing the data objects in the storage;

means for generating display attribute values for at least a first data object;

means for generating a propagation scope field of data objects for a plurality of applications and presenting the propagation scope field to the user for selection of data objects for a propagation group;

means responsive to user selection of a propagation group for setting the display attribute values for the data objects in the propagation group equal to display attribute values for the first data object; and means for displaying a window for a data object of the propagation group using the display attribute values for the propagation group.

6. A data processing system for displaying the contents of data objects through windows opened on a display device, as set forth in claim 5, wherein the means for generating display attribute values set further comprises:

means for providing default display attribute values for at least the first data object;

means for generating an attribute display window for the first data object; and means for monitoring a user input device for user modification of display attribute values displayed in an attribute display window and for changing display attribute values to match the user modifications.

7. A data processing system for displaying the contents of data objects through windows opened on a display device as set forth in claim 6 wherein the means for generating a propagation scope field for user selection of data objects for the propagation group includes:

means responsive to user selection for assigning data objects to the propagation group based on position in an object hierarchy above the first data object;

means responsive to user selection for assigning data objects to the propagation group based on position in an object hierarchy below the first data object;

means responsive to user selection for assigning data objects to the propagation group based on commonalty of display attributes;

means responsive to user selection for assigning data objects to the propagation group based on the data objects being in a single class; and means responsive to user selection for assigning data objects to the propagation group based on the data objects being of a single type.

8. A data processing system for displaying the contents of data objects through windows opened on a display device as set forth in claim 7, and further comprising:

means responsive to user selection for displaying display attribute values within an object hierarchy including the first data object.

* * * * *